(12) United States Patent
Yajima et al.

(10) Patent No.: US 6,970,690 B2
(45) Date of Patent: Nov. 29, 2005

(54) DATA PROCESSING APPARATUS AND CARD-SIZED DATA PROCESSING DEVICE

(75) Inventors: Shinji Yajima, Kawasaki (JP); Shunsuke Fueki, Kawasaki (JP); Masao Nakajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 10/133,322

(22) Filed: Apr. 29, 2002

(65) Prior Publication Data

US 2003/0083037 A1 May 1, 2003

(30) Foreign Application Priority Data

Oct. 29, 2001 (JP) .............................. 2001-330644

(51) Int. Cl.[7] .............................................. H04B 1/16
(52) U.S. Cl. ................. 455/343.1; 455/572; 455/343.2
(58) Field of Search ............................... 455/571, 572, 455/573, 574, 219, 239.1, 240.1, 241.1, 234.1, 455/245.2, 250.1, 251.1, 343.1, 343.2, 343.3, 455/343.5, 343.6; 363/15, 23, 25, 56.05; 323/268–273

(56) References Cited

U.S. PATENT DOCUMENTS

| | | | |
|---|---|---|---|
| 4,188,585 A | * | 2/1980 | Wissel et al. ............ 455/343.1 |
| 5,479,172 A | | 12/1995 | Smith et al. |
| 5,574,697 A | * | 11/1996 | Manning .................... 365/226 |
| 5,615,004 A | * | 3/1997 | Nourrcier, Jr. ........... 455/343.1 |
| 6,111,395 A | * | 8/2000 | Hirade et al. ................ 323/273 |
| 6,134,130 A | | 10/2000 | Connell et al. |
| 6,141,283 A | | 10/2000 | Bogin et al. |
| 6,424,128 B1 | * | 7/2002 | Hiraki et al. ................ 323/268 |

FOREIGN PATENT DOCUMENTS

| | | |
|---|---|---|
| EP | 0 694 826 A2 | 1/1996 |
| EP | 1 058 376 A2 | 12/2000 |
| WO | WO 00/70552 | 11/2000 |
| WO | WO 01/75787 A1 | 10/2001 |

* cited by examiner

*Primary Examiner*—Sonny Trinh
*Assistant Examiner*—Sam Bhattacharya
(74) *Attorney, Agent, or Firm*—Arent Fox PLLC

(57) ABSTRACT

A data processing apparatus and card-sized data processing device that consume less power and operate more reliably. An antenna captures a radio wave sent from an external reader/writer device, and a receiver converts it into an electrical signal. From this electrical signal, a first power supply circuit produces a first supply voltage for use in analog circuits. A second power supply circuit produces a second supply voltage that is different from the first supply voltage, for use in memory circuits. A third power supply circuit produces a third supply voltage that is different from the other voltages, for use in digital circuits. The memory and digital circuits thus operate with different supply voltages optimized for their individual requirements. Total power consumption of the device is reduced by lowering the voltage for the digital circuits, including MPU, while giving a higher voltage to the memory circuits.

8 Claims, 12 Drawing Sheets

DATA PROCESSING APPARATUS AND CARD-SIZED DATA PROCESSING DEVICE

BACKGROUND OF THE INVENTION

1. Field of the Invention

The present invention relates to a data processing apparatus and a card-sized data processing device. More particularly, the present invention relates to a data processing apparatus and a card-sized data processing device which execute prescribed tasks, extracting data and electric power from a received carrier wave that is modulated with an information signal.

2. Description of the Related Art

Card-sized data processing devices with contactless interface have become of interest in recent years, with growing expectations for their various applications, ranging from personal use (e.g., credit cards and commuter passes) to industrial use (e.g., electronic data tags for factory automation and warehouse management purposes). Such devices often provide processing functions to perform sophisticated tasks. To meet today's market needs, they have to have a microprocessor with a higher processing speed, inevitably resulting in increased power consumption. Some designers overcome this problem by optimizing the power supply system in a device, considering the operating voltage of each circuit block. More specifically, a lower supply voltage is provided to digital circuits that can operate at a relatively low voltage, while a higher supply voltage is fed to analog circuits that need a relatively high voltage to satisfy dynamic range requirements. By integrating two dedicated power supply circuits, the power consumption of card-sized data processing devices can be minimized.

FIG. 11 shows a typical structure of a conventional card-sized data processing device. As seen, the illustrated device is composed of the following elements: an antenna 10, four diodes 11-1 to 11-4, a supply voltage generator 13, a demodulator 14, a clock circuit 15, a reset circuit 16, a modulator 17, a microprocessor unit (MPU) 18, and a nonvolatile memory 19.

The antenna 10 emits and captures a radio wave to/from external card reader/writer equipment (not shown) which contains a carrier wave modulated with an information signal. The four diodes 11-1 to 11-4 form a bridge circuit, which full-wave rectifies the radio wave signal received by the antenna 10, thereby extracting the information signal and DC power.

From the DC power appearing at the junction point of the diodes 11-1 and 11-2, the supply voltage generator 13 produces a supply voltage #1 for analog circuits and a supply voltage #2 for digital circuits. More specifically, the supply voltage #1 is fed to the demodulator 14, clock circuit 15, reset circuit 16, and modulator 17, while the supply voltage #2 is fed to the MPU 18 and nonvolatile memory 19.

FIG. 12 shows the detailed structure of the supply voltage generator 13. As seen, the supply voltage generator 13 is composed of a regulator 20, a first capacitor 21, a level converter 22, and a second capacitor 23. With the electric power supplied through the diodes 11-1 and 11-2 (FIG. 11), the regulator 20 outputs a DC voltage with the level adjusted to the intended supply voltage #1. The first capacitor 21 reduces the output impedance of the regulator 20, besides eliminating ripple components contained in its output. The level converter 22 steps down the output of the regulator 20, from supply voltage #1 to supply voltage #2. The second capacitor 23 reduces the output impedance of the level converter 22, besides eliminating ripple components contained in its output.

Referring back to FIG. 11, the demodulator 14 reproduces an information signal from the bridge output signal (i.e., the signal appearing at the junction point of the diodes 11-1 and 11-2) and sends the result to the MPU 18. The clock circuit 15 extracts a clock signal from the bridge output signal and sends it to the MPU 18. The reset circuit 16 produces a reset signal from the bridge output signal and sends it to the MPU 18. The modulator 17 modulates a carrier wave with an output data signal supplied from the MPU 18.

The MPU 18 performs various computational operations according to firmware programs stored in the nonvolatile memory 19 and also to the incoming data signal supplied from the demodulator 14. The processing result is stored back into the nonvolatile memory 19 or supplied to the modulator 17 for transmission. The nonvolatile memory 19 is such a storage device that can retain the stored data even if the power supply is shut down. It stores programs and data that are necessary for the MPU 18 to execute its tasks.

As seen from the above explanation, the demodulator 14, clock circuit 15, reset circuit 16, and modulator 17 operate at a supply voltage #1, while the MPU 18 and nonvolatile memory 19 at another supply voltage #2 that is set to be lower than the supply voltage #1 so as to suppress their power consumption. The conventional device is configured in this way to improve its power requirements.

As a general trend, the operating voltage of microprocessors have been going down with each passing year, and some processors available today can even operate at 1.8 V, for example. In contrast, the supply voltage of nonvolatile memories stays at a relatively high level of about 3 V because such memory devices require a certain magnitude of energy to read or write data. This constraint about memory voltage leads to a problem with the conventional device explained in FIG. 11. That is, the circuit designer cannot reduce the supply voltage #2 further because the nonvolatile memory 19 does not allow it. In this sense, the nonvolatile memory 19 is a bottleneck in low-power design of such data processing devices.

Another problem in the conventional circuit of FIG. 11 is that the MPU 18 and nonvolatile memory 19 are powered up at the same time. The nonvolatile memory 19 requires steadiness of its supply and control signal voltages for correct operation. Simultaneous activation of the MPU 18 may cause an unintended behavior of the nonvolatile memory 19 during the power-up.

SUMMARY OF THE INVENTION

In view of the foregoing, it is an object of the present invention to provide a data processing apparatus and card-sized data processing device which consume less power and operate reliably.

To accomplish the above object, according to the present invention, there is provided a data processing apparatus which receives a radio wave modulated with an information signal and performs a prescribed task with data extracted from the received radio wave. This apparatus comprises a receiver and a first, second, and third power supply circuits. The receiver receives the radio wave and converts it into an electrical signal. From this electrical signal, the first power supply circuit produces a first supply voltage for use in an analog circuit. The second power supply circuit produces a second supply voltage that is different from the first supply voltage, for use in a memory circuit. The third power supply circuit produces a third supply voltage that is different from the first and second supply voltages, for use in a digital circuit.

Also, to accomplish the above object, the present invention provides a card-sized data processing device which receives a radio wave modulated with an information signal and performs a prescribed task with data extracted from the received radio wave. This card-sized data processing device comprises a receiver and a first, second, and third power supply circuits. The receiver receives the radio wave and converts it into an electrical signal. From this electrical signal provided from the receiver, the first power supply circuit produces a first supply voltage for use in an analog circuit. The second power supply circuit produces a second supply voltage that is different from the first supply voltage, for use in a memory circuit. The third power supply circuit produces a third supply voltage that is different from the first and second supply voltages, for use in a digital circuit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
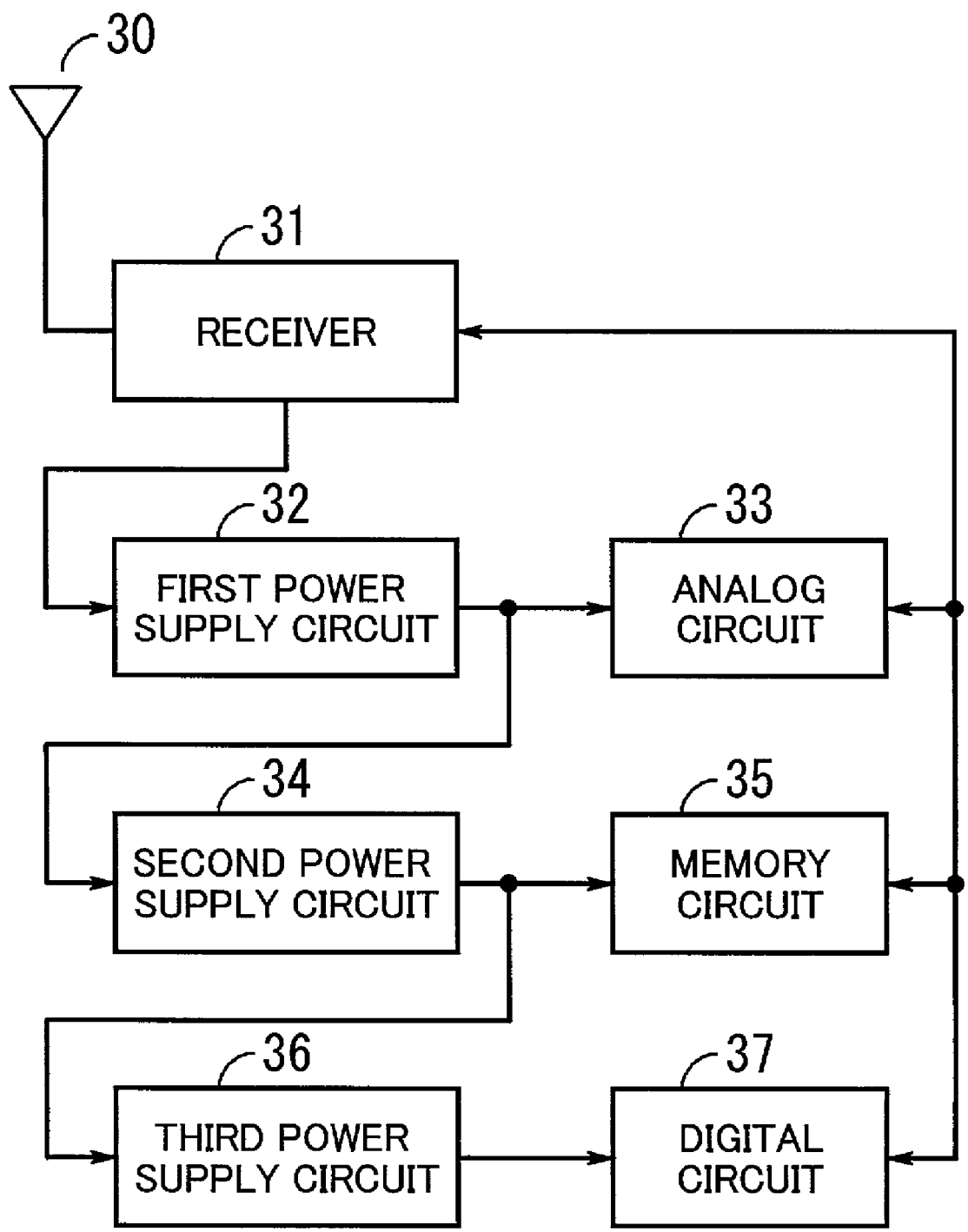
FIG. 1 is a conceptual view of a data processing apparatus according to the present invention.

FIG. 1 is a conceptual view of a data processing apparatus according to the present invention. As seen, the proposed apparatus comprises: an antenna 30, a receiver 31, a first power supply circuit 32, an analog circuit 33, a second power supply circuit 34, a memory circuit 35, a third power supply circuit 36, and a digital circuit 37.

The antenna 30 captures a radio wave radiated from the transmitting end (not shown). The receiver 31 converts the captured radio wave into an electronic signal. The first power supply circuit 32 produces a first supply voltage from the electrical signal that the receiver 31 outputs, and supplies it to the analog circuit 33. The second power supply circuit 34 produces a second supply voltage that is different from the first supply voltage and feeds it to the memory circuit 35. The third power supply circuit 36 produces a third supply voltage that is different from both the first and second supply voltages and feeds it to the digital circuit 37.

The analog circuit 33 may be a modulator and demodulator, for example. The memory circuit 35 may be a nonvolatile memory, which stores data supplied from the digital circuit 37 and analog circuit 33. The digital circuit 37 and analog circuit 33 make access to data stored in the memory circuit 35 as necessary. The digital circuit 37 may be a microprocessor unit (MPU), for example, which performs various computational tasks according to firmware programs stored in the memory circuit 35.

The apparatus of FIG. 1 operates as follows. The antenna 30 captures a radio wave transmitted from an external source (not shown) and feeds it to the receiver 31. The receiver 31 converts the captured radio wave into an electrical signal and then turns it to a DC signal, which is fed to the first power supply circuit 32. The first power supply circuit 32 produces a first supply voltage from this DC signal to energize the analog circuit 33. The second power supply circuit 34 then steps down the first supply voltage to produce a second supply voltage for the memory circuit 35. The third power supply circuit 36 steps down the second supply voltage to produce a third supply voltage for the digital circuit 37.

The above circuit structure enables the first supply voltage, the highest among the three, to be provided to the analog circuit 33 that needs a relatively high voltage to ensure a sufficient dynamic range. It also provides the third supply voltage to the digital circuit 37 which can operate at a relatively lower voltage than the other two circuits do. The second supply voltage, a middle level between the first and third voltages, is supplied to the analog circuit 33 whose operating voltage is higher than that of the digital circuit 37 but lower than that of the analog circuit 33. In this way, the present invention lowers the supply voltage of the digital circuit 37, which is always activated when the data processing apparatus is in use. As a result, the total power consumption of the apparatus is reduced.

While series regulator configuration is generally used for power supply circuits, it is known that the regulators of this type are not responsive to a sudden increase of their load in the case their steady output current is below a certain minimum level. In the data processing apparatus of FIG. 1, the memory circuit 35 operates only occasionally, which causes, from the viewpoint of its power supply, sudden changes of load current. If there were no other loads, the second power supply circuit 34 would show some instability at the instant when the memory circuit 35 begins to operate.

In the proposed circuit configuration, however, the memory circuit 35 is not the only load of the second power supply circuit 34. That is, the second power supply circuit 34 has to feed constantly a certain amount of power to the third power supply circuit 36 to keep the digital circuit 37 active. The presence of this constant load current ensures stable operation of the second power supply circuit 34.

Figure 2:
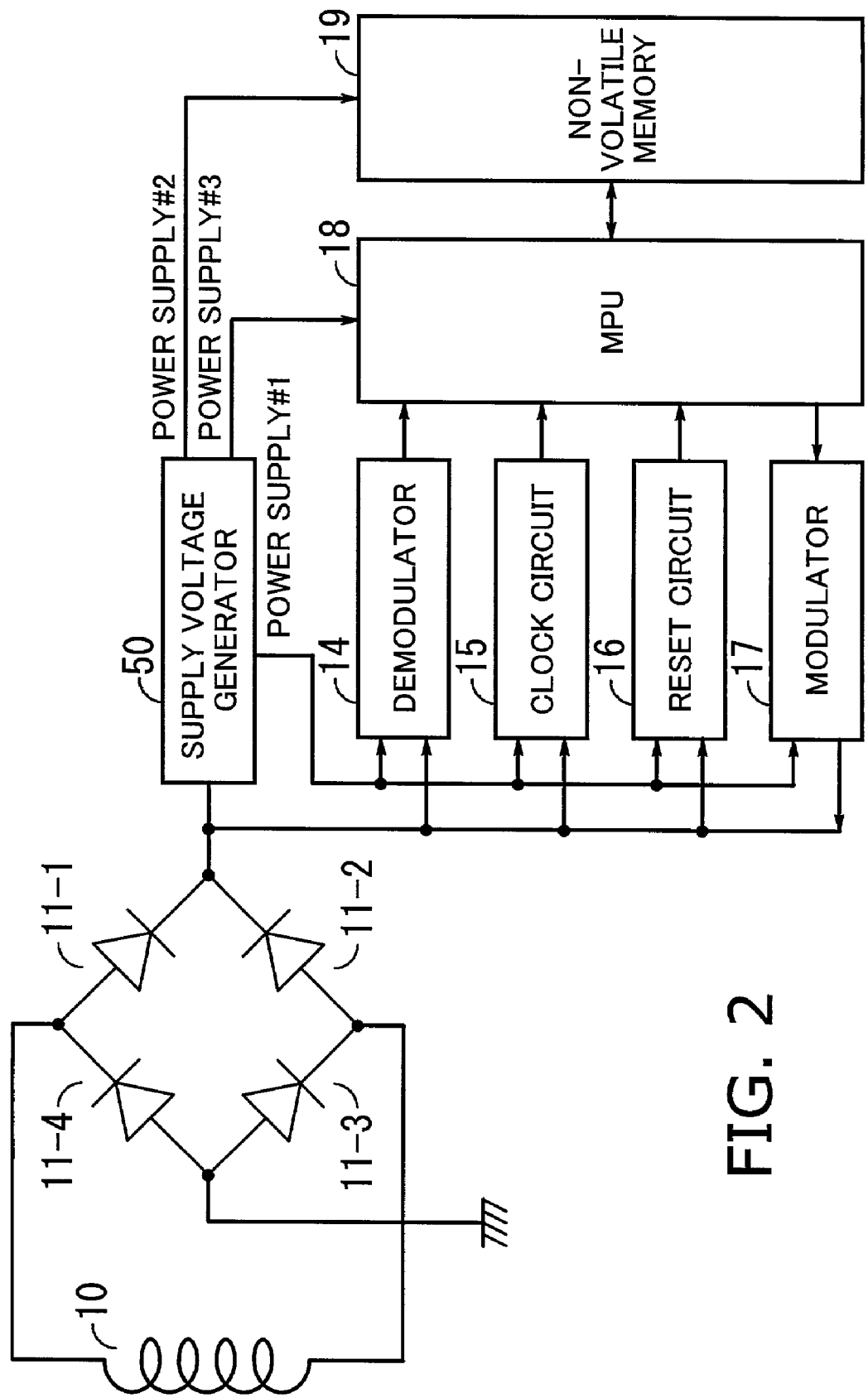
FIG. 2 is a block diagram of a first embodiment of the present invention.

Referring now to FIG. 2, a more specific embodiment of the invention will be described. FIG. 2 is a block diagram of a first embodiment of the present invention, which shows a card-sized data processing device comprising the following elements: an antenna 10, diodes 11-1 to 11-4, a supply voltage generator 50, a demodulator 14, a clock circuit 15, a reset circuit 16, a modulator 17, an MPU 18, and a nonvolatile memory 19.

Specifically, the antenna 10 emits and captures a radio wave to/from card reader/writer equipment (not shown), where the radio wave contains a carrier wave component that is modulated with, for example, amplitude shift keying (ASK) techniques. Four diodes 11-1 to 11-4 form a bridge circuit, which full-wave rectifies the radio wave signal received by the antenna 10, thus isolating an information signal from the carrier, as well as extracting DC power therefrom.

From the DC power appearing at the junction point of the diodes 11-1 and 11-2, the supply voltage generator 50 produces three kinds of supply voltages #1 to #3. More specifically, the first supply voltage #1 is fed to the demodulator 14, clock circuit 15, reset circuit 16, and modulator 17. The second supply voltage #2 is fed to the nonvolatile memory 19, and the third supply voltage #3 is fed to the MPU 18.

Figure 3:
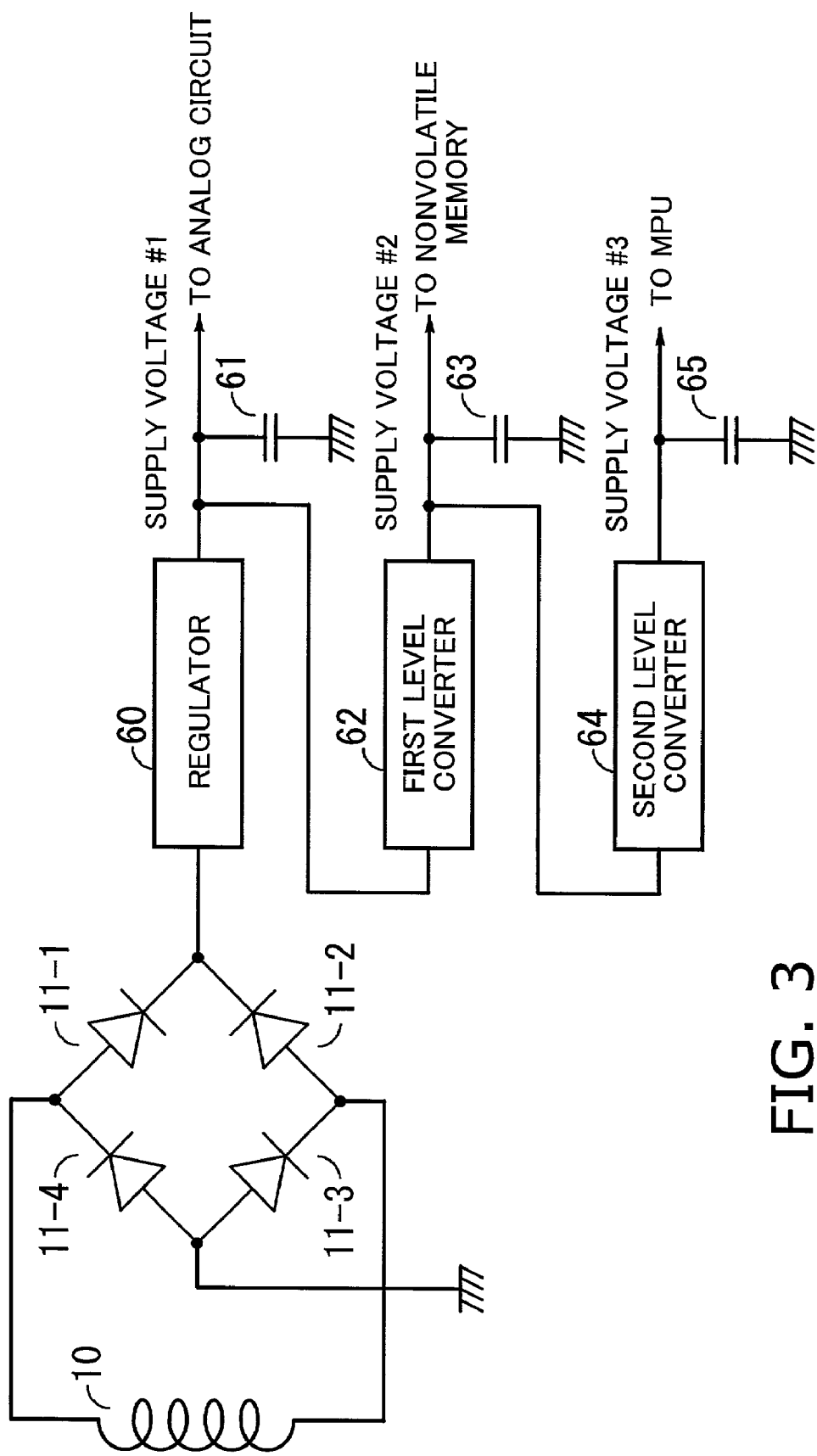
FIG. 3 gives the details of the supply voltage generator shown in FIG. 2.

FIG. 3 shows the details of the supply voltage generator 50. As seen from FIG. 3, the supply voltage generator 50 comprises the following elements: a regulator 60, a first capacitor 61, a first level converter 62, a second capacitor 63, and a second level converter 64, and a third capacitor 65.

From the DC power appearing at the junction point of the diodes 11-1 and 11-2, the regulator 60 outputs a DC voltage, adjusting its level to the intended supply voltage #1. The first capacitor 61 reduces the output impedance of the regulator 60, besides eliminating ripple components contained in its output. The first level converter 62 steps down the output of the regulator 60, from supply voltage #1 to supply voltage #2. The second capacitor 63 reduces the output impedance of the first level converter 62, besides eliminating ripple components contained in its output. The second level converter 64 steps down the output of the first level converter 62, from supply voltage #2 to supply voltage #3. The third capacitor 65 reduces the output impedance of the second level converter 64, besides eliminating ripple components contained in its output.

Figure 4:
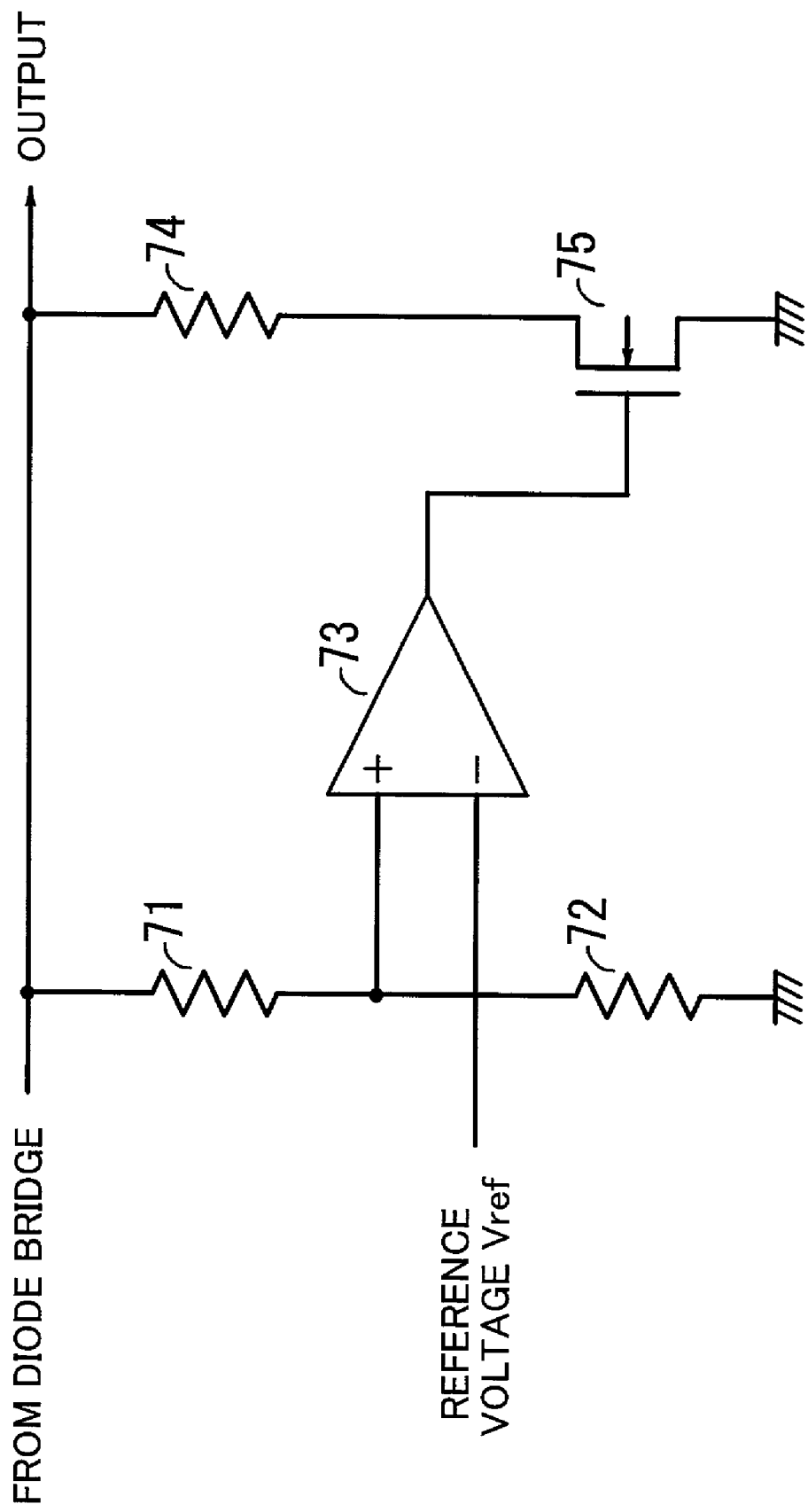
FIG. 4 gives the details of the regulator shown in FIG. 3.

FIG. 4 shows the details of the regulator 60. The regulator 60 comprises resistors 71, 72, and 74, a comparator 73, and an n-channel MOSFET 75. These components as a whole form a shunt regulator, assuming that the receiver 31 (FIG. 1) serves as a constant current source, or that there is a certain amount of output resistance at the source end.

The first two resistors 71 and 72 serve as a voltage divider which provides a fraction of the output voltage to the non-inverting input of the comparator 73 as a feedback. The comparator 73 compares this divided voltage with the reference voltage Vref and supplies the result to the gate of the n-channel MOSFET 75. According to this signal, the n-channel MOSFET 75 varies its resistance to make a certain amount of current flow to the ground, so that the output voltage be maintained at the set level. The third resistor 74 is a current-limiting resistor that protects the n-channel MOSFET 75 from overcurrent. In this way, the circuit of FIG. 4 works as a shunt regulator to yield a stabilized output voltage.

Figure 5:
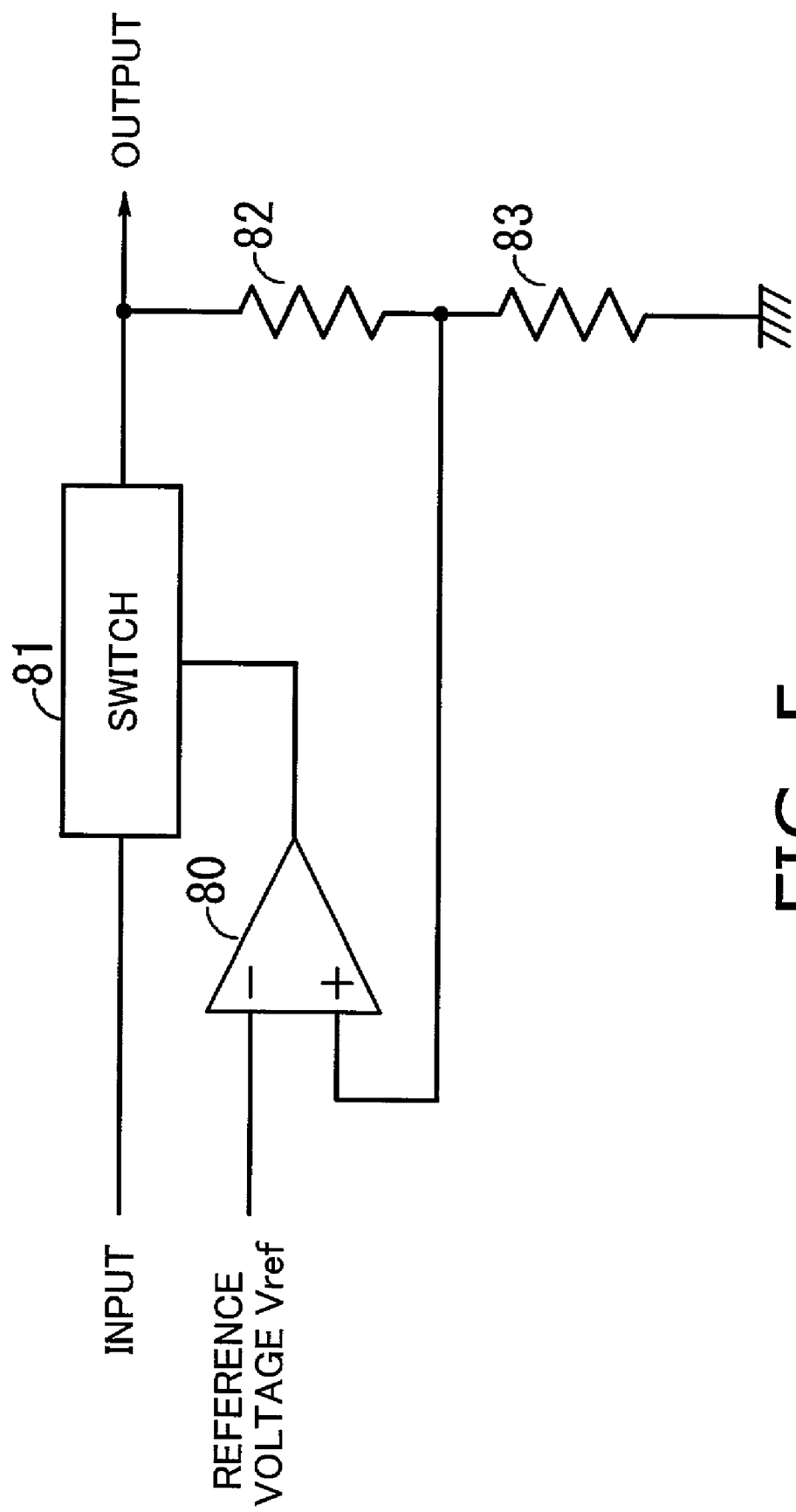
FIG. 5 gives the details of the level converter shown in FIG. 3.

FIG. 5 shows the details of the first and second level converters 62 and 64. As seen, each level converter 62 and 64 comprises the following components: a comparator 80, a switch 81, and two resistors 82 and 83.

The resistors 82 and 83 form a voltage divider which feeds a fraction of the output voltage back to the non-inverting input of the comparator 73 for comparison with a given reference voltage. The result of the comparison is used to control the switch 81. The switch 81 is actually a p-channel MOSFET 90 shown in FIG. 6, which controls the current flowing from input to output, according to its gate voltage given by the comparator 80. That is, the circuit of FIG. 5 operates as a series regulator to yield an output voltage that is determined by the reference voltage Vref.

Referring back to FIG. 2, the demodulator 14 reproduces a data signal from the bridge output signal (i.e., the signal appearing at the junction point of the diodes 11-1 and 11-2) and sends the result to the MPU 18. The clock circuit 15 extracts a clock signal from the bridge output signal and sends it to the MPU 18. The reset circuit 16 produces a reset signal from the bridge output signal and sends it to the MPU 18. The modulator 17 modulates a carrier wave with an output data signal supplied from the MPU 18.

The MPU 18 performs various computational operations according to the programs stored in the nonvolatile memory 19 and also to the incoming data signal supplied from the demodulator 14. The processing result is saved back into the nonvolatile memory 19 or supplied to the modulator 17 for transmission. The nonvolatile memory 19 is a storage device that can retain the stored data even if the power supply is shut down. It stores programs and data that are necessary for the MPU 18 to execute its tasks.

The above-described first embodiment operates as follows. The card-sized data processing device is designed to interact with a reader/writer device (not shown), which transmits a carrier wave with a certain radio frequency, ASK-modulated with information and clock signals. The antenna 10 captures this radio wave when the card-sized data processing device is placed in the vicinity of the reader/writer device. The electrical signal developed at the antenna 10 is then full-wave rectified into a DC signal by a bridge rectifier circuit consisting of four diodes 11-1 to 11-4.

Out of the DC power appearing at the junction point of the diodes 11-1 and 11-2, the regulator 60 produces a DC voltage, adjusting its level to an intended voltage, or supply voltage #1. The supply voltage #1 is fed to analog circuits, being charged in the first capacitor 61 located at the output of the regulator 60. When the supply voltage #1 becomes available, the first level converter 62 steps down it to another intended voltage, or supply voltage #2. The supply voltage #2 is fed to the nonvolatile memory 19, being charged in the second capacitor 63 located at the output of the first level converter 62. When the supply voltage #2 becomes available, the second level converter 64 steps down it to yet another intended voltage, or supply voltage #3. The supply voltage #3 is fed to the MPU 18, being charged in the third capacitor 65 located at the output of the second level converter 64.

As noted above, the supply voltage #1 activates analog circuits, which include a demodulator 14, a clock circuit 15, a reset circuit 16, and a modulator 17. Upon power up, the clock circuit 15 begins producing a clock signal from the bridge output signal for use in the MPU 18. The reset circuit 16 asserts the reset input of the MPU 18 for a while and then negates it to make the MPU 18 start up, at which moment the supply voltage #3 has risen to its intended level. The activated MPU 18 makes access to the nonvolatile memory 19 to fetch the executable programs stored therein. This enables the MPU 18 to interact with the external reader/writer, receiving incoming data from the demodulator 14 and sending outgoing data to the modulator 17.

As described above, the first embodiment of the present invention is configured to have a first level converter 62 to provide the nonvolatile memory 19 with its optimal operating voltage (i.e., supply voltage #2). The proposed circuit structure makes it possible to lower the supply voltage #3 for the MPU 18 without affecting the operation of the nonvolatile memory 19 or any other components in the device. This is effective in reducing the power consumption of the device since the MPU 18 is always activated during the interaction with external reader/writer equipment.

Also, the first embodiment enables the nonvolatile memory 19 operate with a dedicated, optimal power supply, which is decoupled from that of the MPU 18. This configuration ensures reliable reading and writing of data from/to the nonvolatile memory 19.

Figure 6:
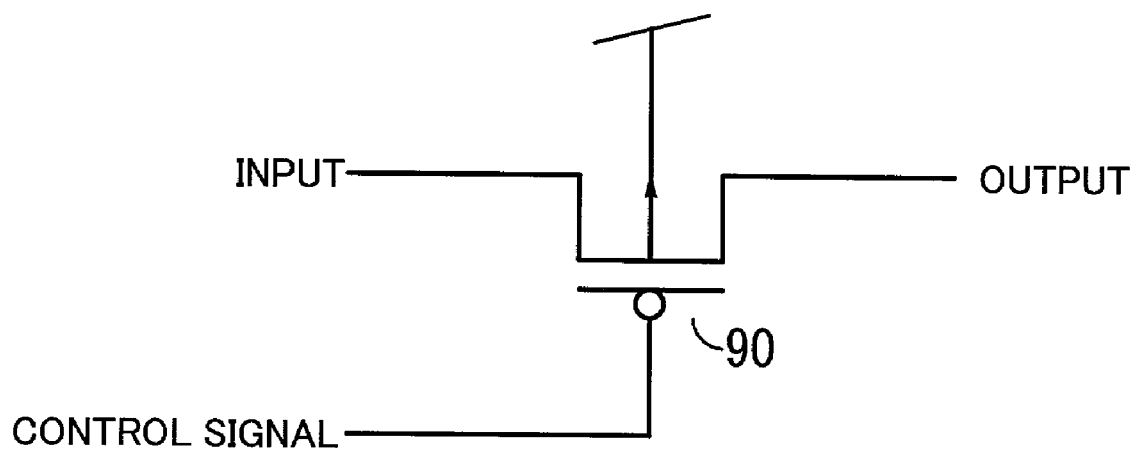
FIG. 6 gives the details of the switch shown in FIG. 5.

While p-channel MOSFETs are known to be relatively slow in switching from "off" state to "on" state, this problem does not happen to the p-channel MOSFET 90 of FIG. 6. That is, according to the present invention, the second level converter 64 continuously imposes a certain amount of load on the first level converter 62 since the always-active MPU 18 consumes electric power constantly. This makes the p-channel MOSFET 90 stay in a conductive state, thus being free from the above switching speed problem.

Further, the first embodiment of the present invention employs a plurality of level converters for operating different groups of circuitry. This arrangement prevents the circuits in a device from interfering with each other through a common power supply, thus ensuring more reliable operation of the device.

Figure 7:
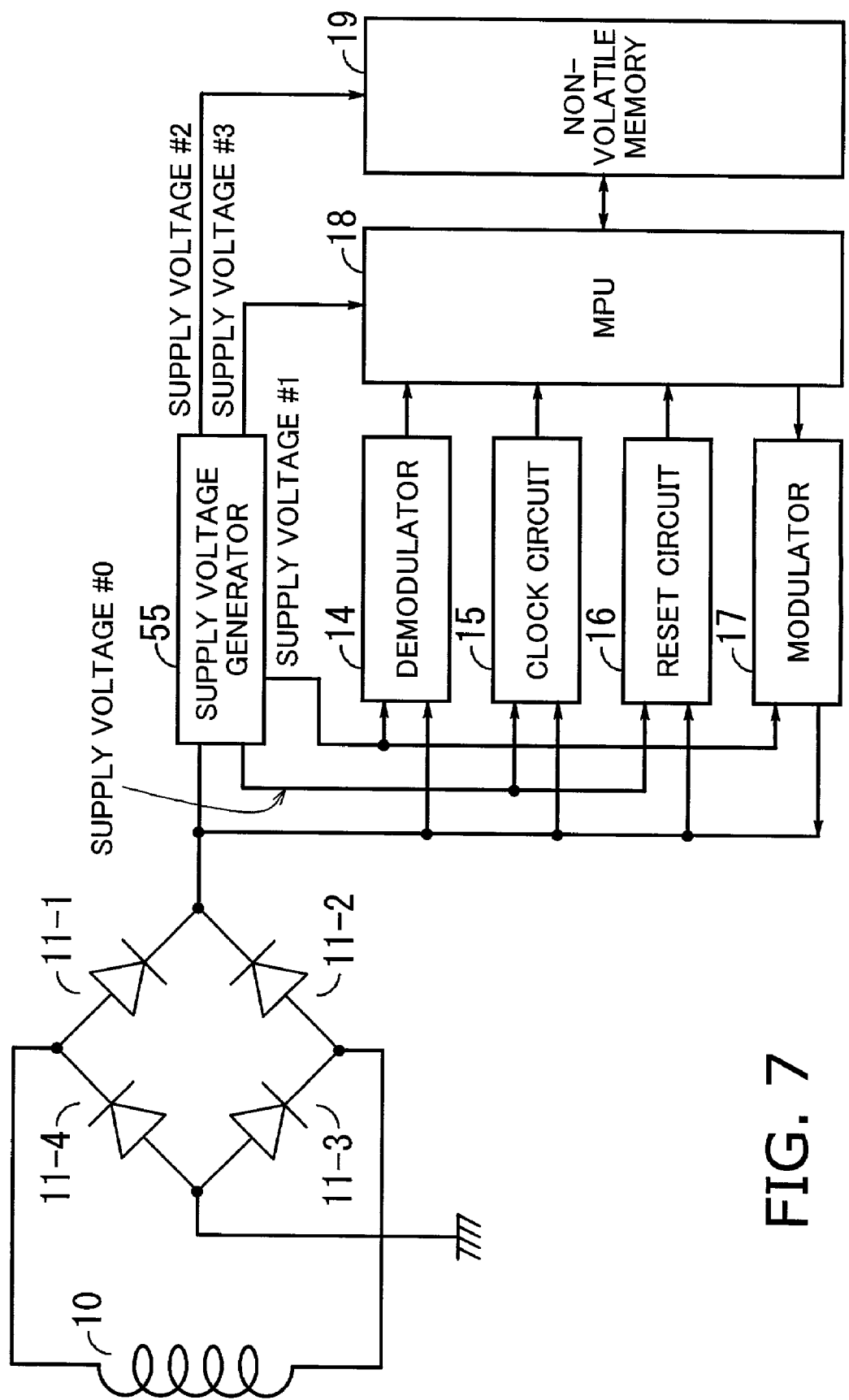
FIG. 7 is a block diagram of a second embodiment of the present invention.

Referring next to FIG. 7 and subsequent drawings, we are going to provide another specific embodiment of the invention. FIG. 7 is a block diagram of a card-sized data processing device according to a second embodiment of the present invention. The illustrated device shares some common functions and signals with the first embodiment discussed in FIG. 2. The following explanation will focus on its distinctive points, while affixing like reference numerals to like elements.

The second embodiment differs from the first embodiment in that it has a supply voltage generator 55 that is different from the foregoing supply voltage generator 50, and also in that the clock circuit 15 and reset circuit 16 are provided with a dedicated power source, named "supply voltage #0." The other circuit blocks operate just as in the first embodiment shown in FIG. 2.

Figure 8:
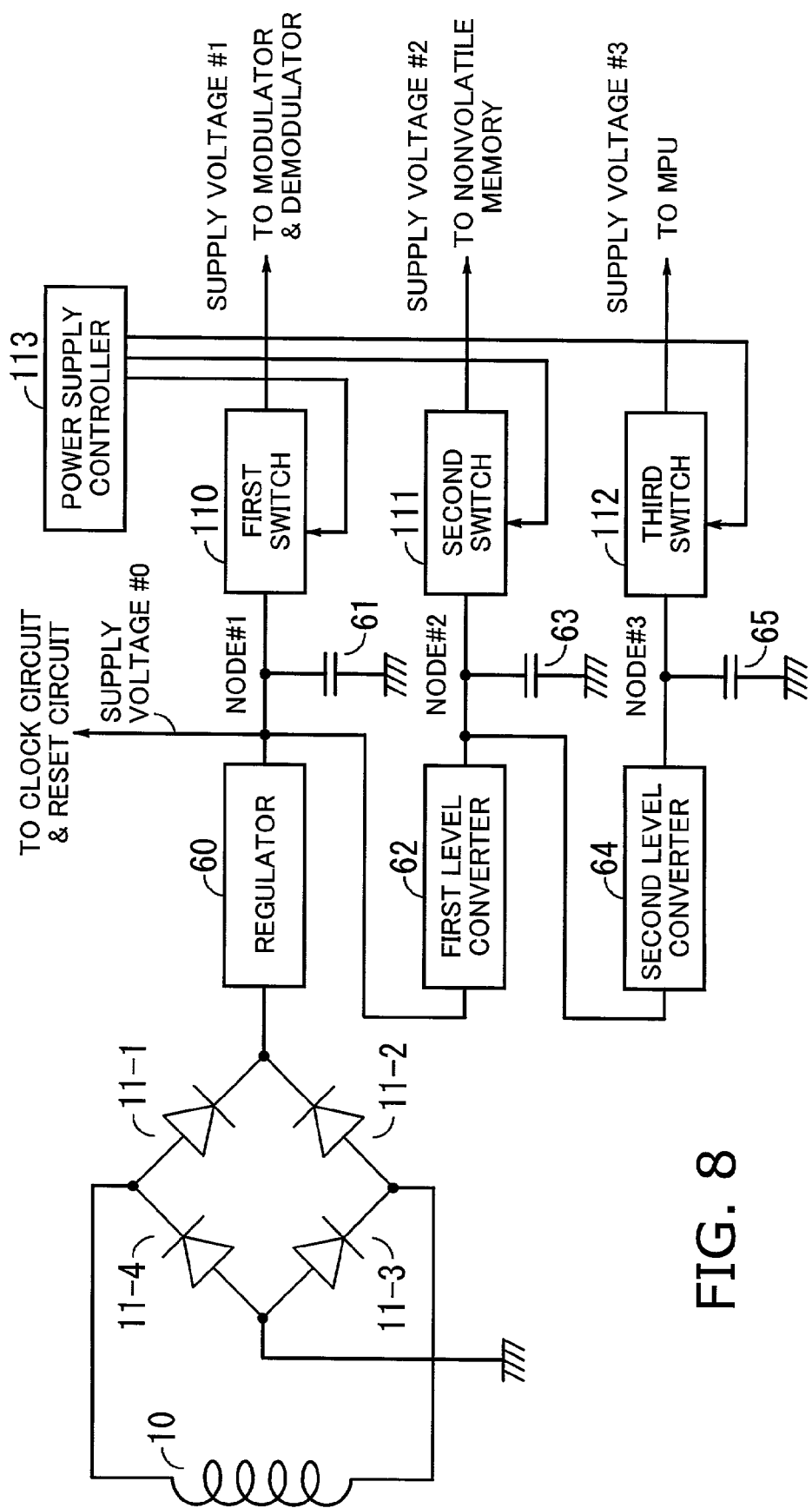
FIG. 8 gives the details of the supply voltage generator shown in FIG. 7.

FIG. 8 gives the details of the supply voltage generator 55 shown in FIG. 7. This circuit shares some common elements with the circuit discussed in FIG. 3. The following explanation will not cover them, while affixing like reference numerals to like elements.

The supply voltage generator 55 of FIG. 8 differs from that of FIG. 3 in that three switches 110 to 112 are placed at the outputs of the regulator 60, first level converter 62, and second level converter 64, respectively. Another difference is a power supply controller 113 that is employed to control those switches 110 to 112.

The switches 110 to 112 are MOSFET switches illustrated in FIG. 6. The first switch 110 controls power supply to the demodulator 14 and modulator 17 by turning on and off the supply voltage #1 produced by the regulator 60, according to a control signal sent from the power supply controller 113. The second switch 111 controls power supply to the nonvolatile memory 19 by turning on and off the supply voltage #2 produced by the first level converter 62, according to another control signal sent from the power supply controller 113. Likewise, the third switch 112 controls power supply to the MPU 18 by turning on and off the supply voltage #3 produced by the second level converter 64, according to yet another control signal sent from the power supply controller 113.

The power supply controller 113 is constructed with a timer and other components. When a certain level of voltage is developed at the diode bridge output, the power supply controller 113 starts counting the time with its integral timer circuit. It activates the two switches 110 and 112 one by one when the timer reaches each predetermined value. Besides, the power supply controller 113 may control the second switch 111 in such a way that the nonvolatile memory 19 will be powered only when there is an active access request.

The second embodiment operates as follows. As noted earlier, the card-sized data processing device interacts with a reader/writer device, using a radio-frequency carrier wave that is ASK-modulated with information and clock signals. The antenna 10 captures this radio wave when the card-sized data processing device has reached the vicinity of the reader/writer device. The electrical signal developed at the antenna 10 is then full-wave rectified into a DC signal by a bridge rectifier circuit consisting of four diodes 11-1 to 11-4. Out of the DC power appearing at the junction point of the diodes 111 and 11-2, the regulator 60 in the supply voltage generator 55 produces a DC voltage, adjusting its level to an intended voltage, i.e., supply voltage #0.

Figure 9:
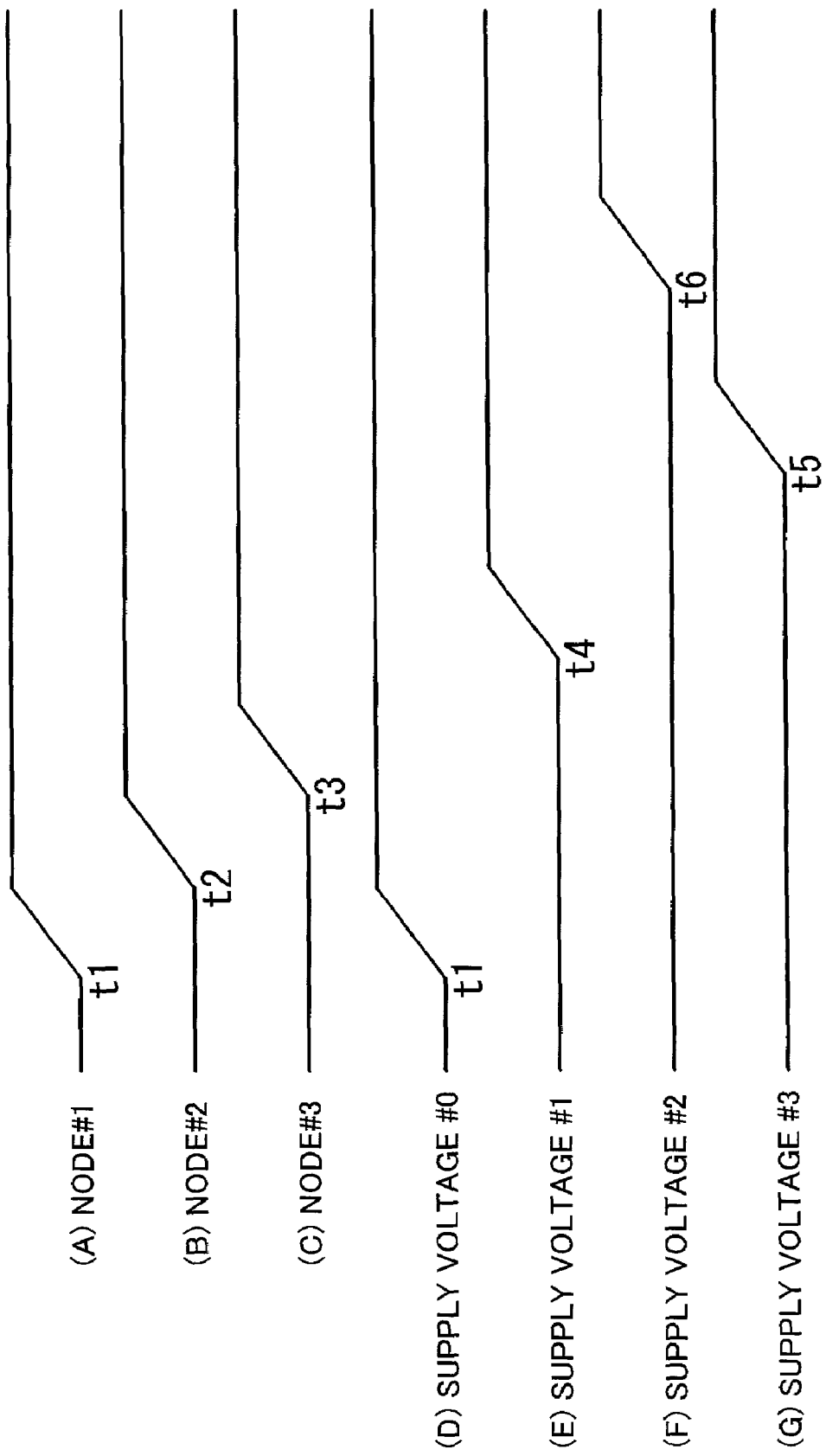
FIG. 9 explains how the node voltages and power supply voltages vary with time in the second embodiment shown in FIGS. 7 and 8.

FIG. 9 is a timing diagram showing how the voltages at nodes #1 to #3 and power supply voltages #0 to #3 vary with time in the second embodiment shown in FIG. 8. First, the voltage of node #1 (i.e., output of regulator 60) begins to rise at time point t1 as shown in part (A) of FIG. 9, which means activation of the supply voltage #0 as shown in part (D) of FIG. 9. With the supply voltage #0 given, the clock circuit 15 and reset circuit 16 start supplying a clock signal and reset signal to the MPU 18. The reset circuit 16 resets signal to the MPU 18 for a predetermined period.

With the active output of the regulator 60, the first level converter 62 begins its step-down operation. As a result, the voltage of node #2 starts to rise at time point t2 as shown in part (B) of FIG. 9, which enables the second level converter 64 begin its step-down operation, causing the voltage of node #3 to rise at time point t3 as shown in part (C) of FIG. 9.

Subsequently, the power supply controller 113 turns on the first switch 110 at time point t4. Since this causes the supply voltage #1 to go up as shown in part (E) of FIG. 9, the demodulator 14 and modulator 17 become ready for operation. The power supply controller 113 then activates the third switch 112 at time point t5, making the supply voltage #3 rise as shown in part (G) of FIG. 9. The MPU 18 is powered up accordingly.

The above-described sequence permits the clock circuit 15 and reset circuit 16 to receive the supply voltage #0 at time point t1. This is followed by the demodulator 14 and modulator 17, which receive the supply voltage #1 at time point t4, and then by the MPU 18, which receives the supply voltage #3 at time point t5. The MPU 18 is now able to interact with the external reader/writer, receiving incoming data from the demodulator 14 and sending outgoing data to the modulator 17.

Suppose here that the MPU 18 needs to make access to the nonvolatile memory 19. The power supply controller 113 detects this and thus turns on the second switch 111 at time point t6 as shown in part (F) of FIG. 9. As a result, the supply voltage #2 is fed to the nonvolatile memory 19, allowing the MPU 18 to write and read data to/from intended addresses. When this memory access from the MPU 18 is finished, the power supply controller 113 turns off the second switch 111 to stop feeding the supply voltage #2 to the nonvolatile memory 19.

As seen from the above, the second embodiment employs switches 110 to 112 to provide each supply voltage #1 to #3 at the right timing. This feature ensures reliable operation of the nonvolatile memory 19 because it stays disabled until the control signals from the MPU 18 becomes stable. In addition, the arrangement of the second embodiment contributes to total power reduction of the device, since it energizes the nonvolatile memory 19 only when necessary. This power control technique may be applied not only to the nonvolatile memory 19, but also to other circuit blocks if they are used only occasionally.

Regarding the time sequence of power control, the device may activate a circuit with a large power consumption or a circuit that needs some setups earlier than any other ones. While, as mentioned earlier, different circuits could interfere with each other when they were connected to a common power supply, the above control policy prevents that kind of interference from happening.

Figure 10:
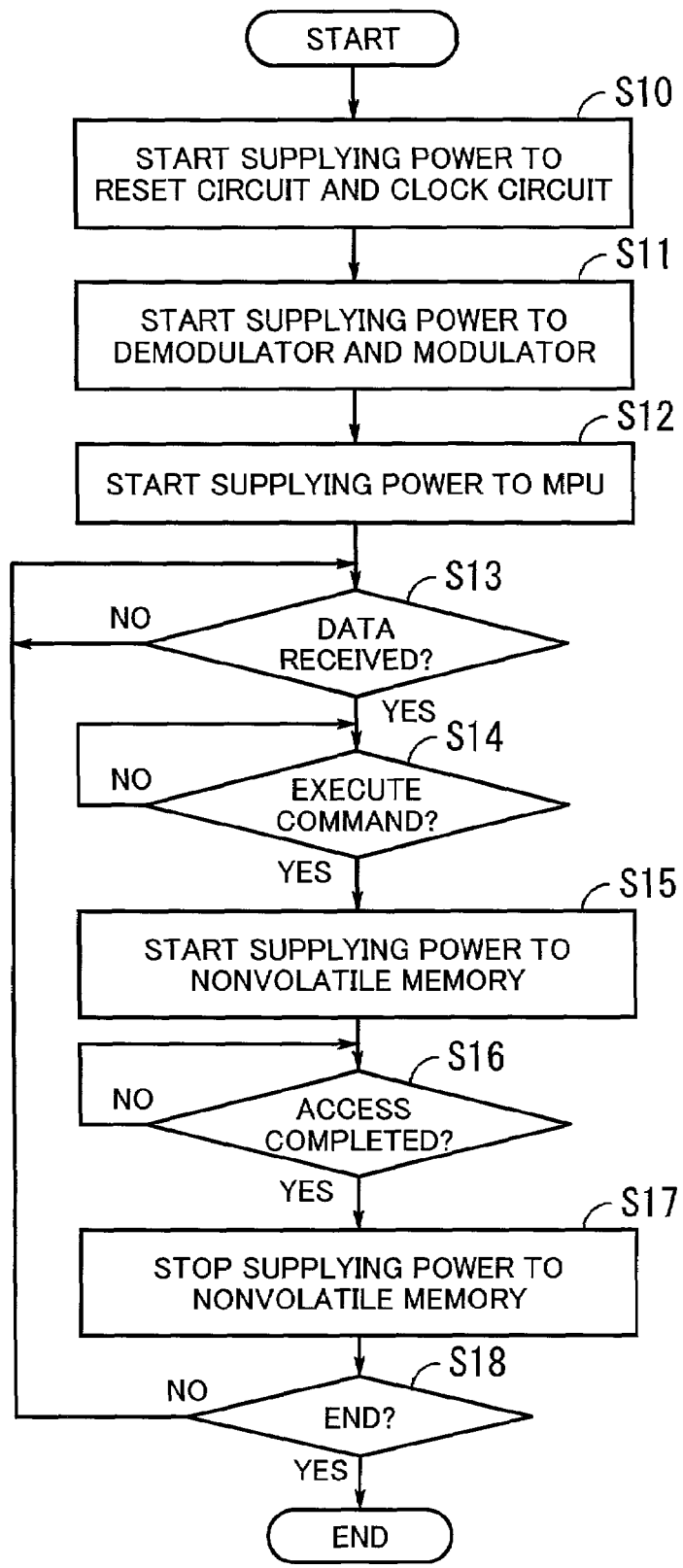
FIG. 10 is a flowchart which explains a general process flow of power control in the second embodiment.
Figure 11:
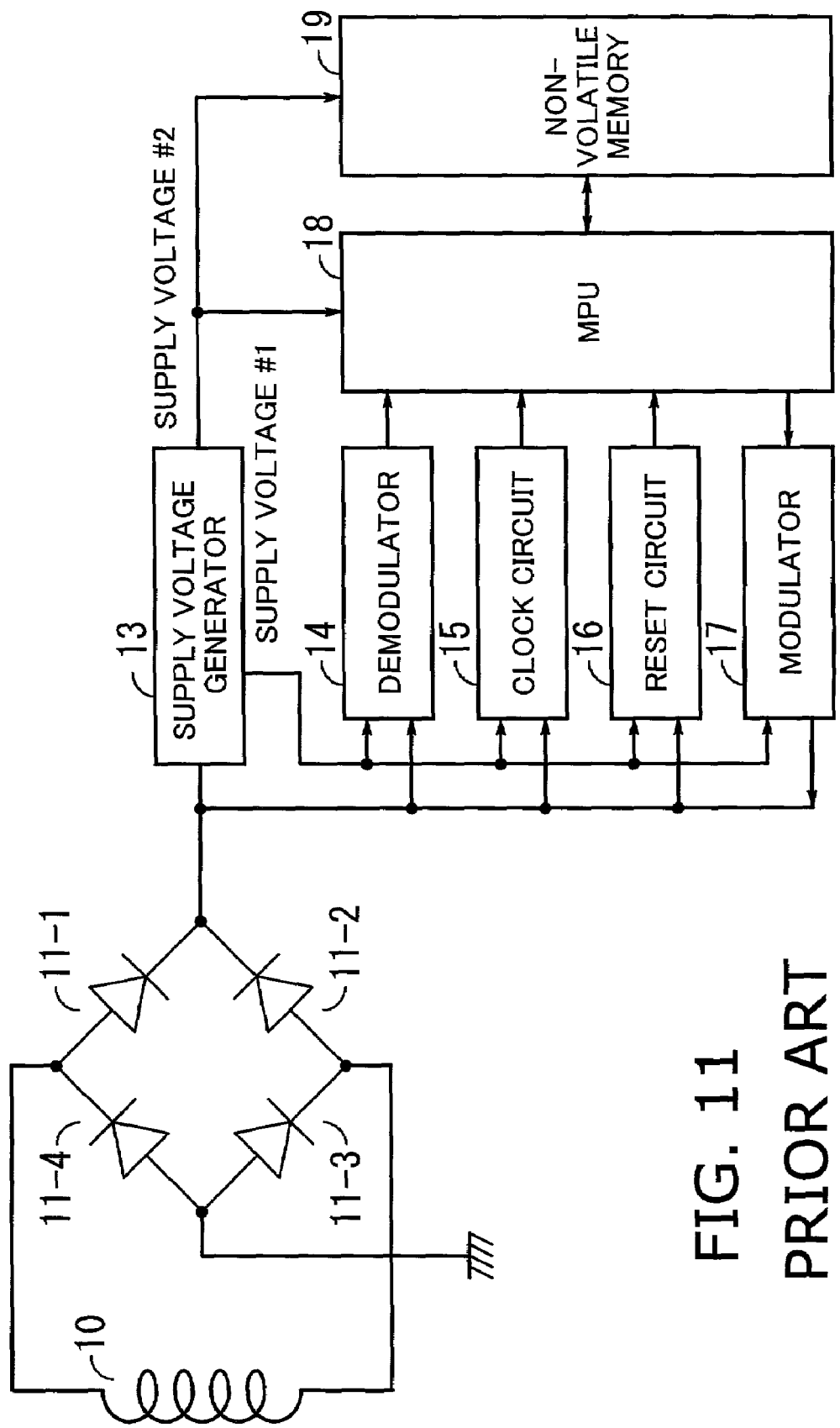
FIG. 11 shows a typical structure of a conventional card-sized data processing device.
Figure 12:
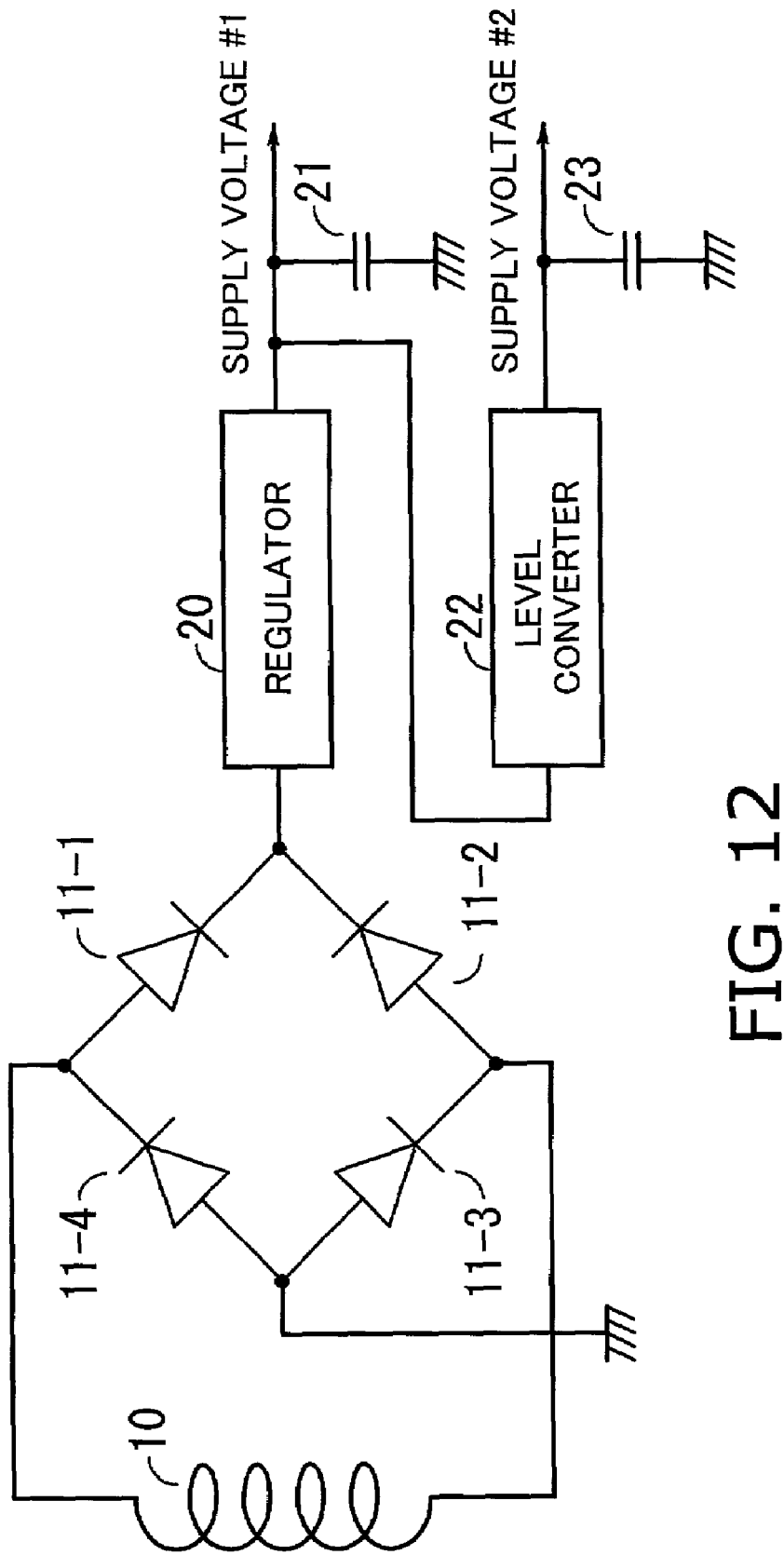
FIG. 12 gives the details of the supply voltage generator used in the conventional device of FIG. 11.

Referring finally to the flowchart of FIG. 10, the processing sequence executed in the second embodiment will be explained. This sequence is initiated when the device shown in FIG. 7 has reached the vicinity of a reader/writer device. More specifically, it proceeds according to the following steps:

(S10) The regulator 60 starts feeding the supply voltage #0 to the clock circuit 15 and reset circuit 16. That is, the regulator 60 produces a supply voltage from a DC voltage at the junction point of the diodes 11-1 and 11-2, controlling it to be a predetermined voltage. The produced voltage, i.e., supply voltage #1, is provided to the clock circuit 15 and reset circuit 16.

(S11) The power supply controller 113 starts feeding the supply voltage #1 to the demodulator 14 and modulator 17 by turning on the first switch 110.

(S12) The power supply controller 113 starts feeding the supply voltage #3 to the MPU 18 by turning on the third switch 112.

(S13) By parsing the output of the demodulator 14, the MPU 18 determines whether any meaningful information is received from the reader/writer device. If so, the process advances to step S14. If not, this step S13 is repeated.

(S14) The power supply controller 113 determines whether the MPU 18 has any command to execute. If it has, the process advances to step S15. If not, this step S14 is repeated.

(S15) The power supply controller 113 starts feeding the supply voltage #2 to the nonvolatile memory 19 by turning on the second switch 111.

(S16) The power supply controller 113 determines whether the MPU 18 has finished its access to the nonvolatile memory 19. If so, the process advances to step S17. Otherwise, this step S16 is repeated.

(S17) The power supply controller 113 stops feeding the supply voltage #2 to the nonvolatile memory 19 by turning off the second switch 111.

(S18) The MPU 18 determines whether to terminate the present process. If the process should be continued, the MPU 18 returns to step S13. If not, the MPU 18 exits from the present process.

The second embodiment shown in FIG. 7 can be implemented in the process explained above.

While we have described two embodiments so far, they should be considered as illustrative only, and we do not intend to limit the present invention to those specific circuit arrangements. Rather, the present invention would include a number of variations. Take the first level converter 62, for example. While it is placed at the output of the regulator 60 in the foregoing two embodiments, the first level converter 62 may be connected directly to the junction point of the diodes 11-1 and 11-2. Likewise, it is possible to configure the second level converter 64 such that it will receive source power directly from that same junction point, or from the output of the regulator 60.

Regarding the transmission medium for information and operating power, it would be possible to use a medium other than radio waves, such as infrared rays.

Further, the present invention should not be limited to card-sized data processing devices. Needless to say, it is possible to apply the concept of the present invention to other types of data processing devices. It should also be noted that the most part of the circuit shown in FIG. 2 or FIG. 7 can be implemented in a semiconductor device or devices.

The above discussion is summarized as follows. According to the present invention, a data processing apparatus receives a radio wave modulated with an information signal and performs a prescribed task with data extracted from the received radio wave. The apparatus comprises a radio wave receiver and three power supply circuits. The receiver receives the radio wave and converts it into an electrical signal, from which the first power supply circuit produces a first supply voltage for use in an analog circuit. The second power supply circuit produces a second supply voltage that is different from the first supply voltage, for use in a memory circuit, and a third power supply circuit produces a third supply voltage that is different from the other voltages, for use in a digital circuit. The above arrangement of the present invention permits different circuits to operate with different supply voltages optimized for their individual requirements, thereby reducing the total power consumption of the apparatus, as well as ensuring correct operation of each part of the apparatus. Such features of the present invention are considered particularly beneficial for card-sized data processing devices, which are required to operate with less power consumption.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data processing apparatus which receives a radio wave modulated with an information signal and performs a prescribed task with data extracted from the received radio wave, comprising:

a receiver which receives the radio wave and converts the received radio wave into an electrical signal;

a first power supply circuit which produces a first supply voltage from the electrical signal provided from said receiver, for use in an analog circuit;

a second power supply circuit which produces a second supply voltage that is different from the first supply voltage, for use in a memory circuit; and a third power supply circuit which produces a third supply voltage that is different from the first and second supply voltages, for use in a digital circuit.

2. The data processing apparatus according to claim 1, wherein:

said second power supply circuit produces the second supply voltage by stepping down the first supply voltage; and said third power supply circuit produces the third supply voltage by stepping down the second supply voltage.

3. The data processing apparatus according to claim 1, further comprising:
  a switch circuit inserted between the second power supply circuit and the memory circuit;
  a control circuit which turns on said switch circuit after the second supply voltage becomes stable.

4. The data processing apparatus according to claim 1, further comprising:
  a switch circuit inserted between the second power supply circuit and the memory circuit;
  a control circuit which turns on said switch circuit to feed power to the memory circuit only when there is an active access request to the memory circuit.

5. A card-sized data processing device which receives a radio wave modulated with an information signal and performs a prescribed task with data extracted from the received radio wave, comprising:
  a receiver which receives the radio wave and converts the received radio wave into an electrical signal;
  a first power supply circuit which produces a first supply voltage from the electrical signal provided from said receiver, for use in an analog circuit;
  a second power supply circuit which produces a second supply voltage that is different from the first supply voltage, for use in a memory circuit; and
  a third power supply circuit which produces a third supply voltage that is different from the first and second supply voltages, for use in a digital circuit.

6. The card-sized data processing device according to claim 5, wherein:
  said second power supply circuit produces the second supply voltage by stepping down the first supply voltage; and
  said third power supply circuit produces the third supply voltage by stepping down the second supply voltage.

7. The card-sized data processing device according to claim 5, further comprising:
  a switch circuit inserted between the second power supply circuit and the memory circuit; and
  a control circuit which turns on said switch circuit after the second supply voltage becomes stable.

8. The card-sized data processing device according to claim 5, further comprising:
  a switch circuit inserted between the second power supply circuit and the memory circuit; and
  a control circuit which turns on said switch circuit to feed power to the memory circuit only when there is access to the memory circuit.

* * * * *